US012627478B2

(12) United States Patent     (10) Patent No.:   US 12,627,478 B2

Kam et al.           (45) Date of Patent:     May 12, 2026

(54) QUANTUM RESISTANT LEDGER FOR SECURE COMMUNICATIONS

(71) Applicant: Lockheed Martin Corporation, Bethesda, MD (US)

(72) Inventors: Ambrose Kam, Westampton, NJ (US); Alexander Richard Vesey, Newburg, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 210 days.

(21) Appl. No.: 18/358,378

(22) Filed: Jul. 25, 2023

(65)        Prior Publication Data

US 2024/0048369 A1     Feb. 8, 2024

Related U.S. Application Data

(60) Provisional application No. 63/369,406, filed on Jul. 26, 2022.

(51) Int. Cl.
| | |
|---|---|
| *H04L 9/08* | (2006.01) |
| *H04L 9/30* | (2006.01) |
| *H04L 9/32* | (2006.01) |

(52) U.S. Cl.
CPC ............ *H04L 9/0852* (2013.01); *H04L 9/088* (2013.01); *H04L 9/30* (2013.01); *H04L 9/3247* (2013.01)

(58) Field of Classification Search
CPC ................ H04L 9/0852; H04L 9/3093; H04L 9/3247; H04L 9/30; H04L 9/088; H04L 9/50; H04L 2209/80
See application file for complete search history.

(56)          References Cited

U.S. PATENT DOCUMENTS

| | | | | |
|---|---|---|---|---|
| 11,206,131 | B1 * | 12/2021 | Griffin | ................. H04L 9/0869 |
| 11,582,024 | B2 * | 2/2023 | Yang | ..................... H04L 9/0637 |
| 11,838,431 | B2 * | 12/2023 | Poeppelmann | ....... H04L 9/0877 |
| 12,200,107 | B1 * | 1/2025 | Shea | ..................... H04L 9/0838 |
| 12,231,568 | B2 * | 2/2025 | Ozmen | ................. H04L 9/3093 |
| 12,309,263 | B2 * | 5/2025 | Linton | .................. G06N 20/00 |
| 2003/0219127 | A1 * | 11/2003 | Russ | ................ H04N 21/42684 |
| | | | | 348/E7.06 |
| 2003/0221100 | A1 * | 11/2003 | Russ | ................... H04L 12/2805 |
| | | | | 713/153 |

(Continued)

OTHER PUBLICATIONS

The Future of Cryptocurrency Blockchains in the Quantum Era; Sarah Alghamdi and Sultan Almuhammadi College of Computer Science and Mathematics King Fahd University of Petroleum and Minerals, Dhahran, Saudi Arabia; 2021 IEEE International Conference on Blockchain (Blockchain); Dec. 6-8, 2021. pp. 544-551.*
International Search Report and Written Opinion corresponding to PCT/US2023/028574, Jun. 26, 2024, 16 pages.

(Continued)

*Primary Examiner* — Mohammad A Siddiqi
(74) *Attorney, Agent, or Firm* — Baker Botts L.L.P.

(57)          ABSTRACT

According to an embodiment, a method includes identifying, by a first network component, data and determining a security level from a plurality of security levels associated with the data. The method also includes determining an encryption scheme from a plurality of encryption schemes to apply to the data and applying, using a Quantum Resistant Ledger (QRL), the encryption scheme to the data to generate encrypted data. The method further includes communicating the encrypted data to a second network component.

20 Claims, 15 Drawing Sheets

(56)　　　　　　References Cited

U.S. PATENT DOCUMENTS

| | | | | |
|---|---|---|---|---|
| 2019/0319800 A1* | 10/2019 | Misoczki | .............. | H04L 9/0662 |
| 2019/0354962 A1* | 11/2019 | Spector | .............. | G06Q 20/3678 |
| 2020/0226123 A1* | 7/2020 | Nixon | ................ | G06F 16/2379 |
| 2021/0281427 A1* | 9/2021 | Davis | ................... | H04L 9/3239 |
| 2021/0314324 A1* | 10/2021 | Wong | ................ | H04L 63/0428 |
| 2022/0209944 A1 | 6/2022 | Nix | | |
| 2022/0385479 A1* | 12/2022 | Hoffstein | .............. | H04L 9/3093 |
| 2023/0112482 A1* | 4/2023 | Stockert | ............... | H04W 48/02 |
| | | | | 707/822 |
| 2024/0007276 A1* | 1/2024 | Piller | ........................ | H04L 9/50 |
| 2024/0422010 A1* | 12/2024 | Tan | ....................... | H04W 12/35 |

OTHER PUBLICATIONS

Tiago M. Fernandez-Carames et al., "Towards Post-Quantum Blockchain: A Review on Blockchain Cryptography Resistant to Quantum Computing Attacks" IEEE Access, IEEE, USA, vol. 8, Jan. 22, 2020 (Jan. 22, 2020), pp. 21091-21116.
Sebastian Paul et al. "Mixed Certificate Chains for the Transition to Post-Quantum Authentication in TLS 1.3", Proceedings of the 14th ACM Web Science Conference 2022, ACMPUB27, New York, NY, USA May 30, 2022 (May 30, 2022), pp. 727-740.
Andrada-Teodora Ciulei et al., "Preparation for Post-Quantum era: a survey about blockchain schemes from a post-quantum perspective", IACR, International Association for Cryptologic Research, Jan. 9, 2022 (Jan. 9, 2022), pp. 1-38.
Melissa Azouaoui et al., "Post-Quantum Authenticated Encryption against Chosen-Ciphertext Side-Channel Attacks", IACR, International Association for Cryptologic Research, vol. 20220714: 070919 Jul. 14, 2022 (Jul. 14, 2022), pp. 1-25.

* cited by examiner

Screenshot 400 secp256k1 unavailable, reverting to browser version
Custom GRPC endpoint: [127.0.0.1:19009]
Creating Crystals Keys for: Q0D0500af05ca419b42fa26b514553bac9086cc451770d99dc51545De7612df4D396fa3d06d0cfe
XMSS Key
ECDSA PX created
Kyber Keys Created!
Dilithium Keys Created!
    Lattice keys written to ../ephemeral_bob.json
[ec2-user@ec21n-06b34be62 qrl-cli-master] c ./bin/run generate-lattice-keys –grpc=127.0.0.1:19009 -w ../wallet_bob.jso
n -i 0 -c ../ephemeral_bob.json -b
secp256k1 unavailable, reverting to browser version
Custom GRPC endpoint: [127.0.0.1:19009]
Creating Crystals Keys for: Q0D0500af05ca419b42fa26b514553bac9086ee451770d99dc51540e7612df40396fa3d06d0cfe
XMSS Key
ECD5A  PX created.

```
-rw-rw-r--.      1 ec2-user    ec2-user      3605   May 13  06:54   package -lock.json
drwxrwxr-x.      9 ec2-user    ec2-user      4096   Mar 17  2020    QRL-2.0.0
-rw-r--r--.      1 root        root         66909   May 20  05:36   QRL-2.0.0.zip
drwxrwxr-x.      6 ec2-user    ec2-user       228   May 14  2020    qrl-cli-1.7.0
-rw-r--r--.      1 root        root        722942   May 20  05:36   qrl-cli-1.7.0.zip
drwxrwxr-x.      5 ec2-user    ec2-user      4096   May 13  05:37   qrl-cli-master
-rw-r--r--.      1 root        root        921796   May 13  05:29   qrl-cli-master.zip
drwxrwxr-x      13 ec2-user    ec2-user      4096   May 13  05:30   QRL-master
-rw-r--r--.      1 root        root         67169   May 6   11:45   QRL-master.zip
-rw-rw-r--.      1 ec2-user    ec2-user       462   May 6   07:06   requirements.txt
-rw-rw-r--.      1 ec2-user    ec2-user       732   May 13  05:55   wallet_alice.json
-rw-rw-r--.      1 ec2-user    ec2-user       724   May 13  05:51   wallet_bob.json
[ec2-user@ec2lm-06b344be62]| $ unzip ephemeral-chat-poc-master.zip
Archive: ephemeral-chat-poc-master.zip
62e7b3e6eec5icf9]c2deScd]9255f08cdfb4761
    creating: ephemeral-chat-poc-master/
```

410
420
430
440

*FIG. 4*

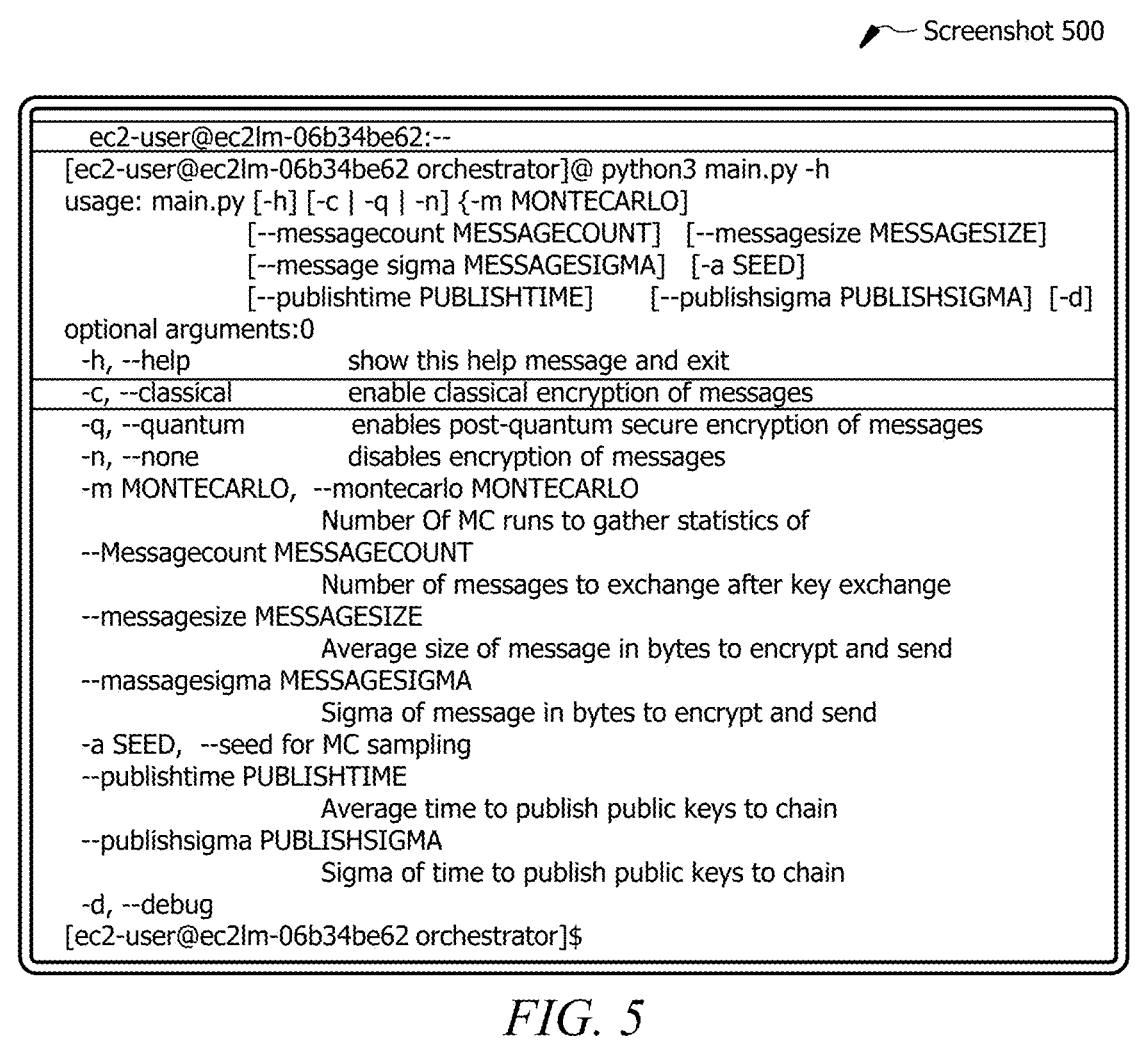

Screenshot 500

```
ec2-user@ec2lm-06b34be62:--
[ec2-user@ec2lm-06b34be62 orchestrator]@ python3 main.py -h
usage: main.py [-h] [-c | -q | -n] {-m MONTECARLO]
                [--messagecount MESSAGECOUNT]  [--messagesize MESSAGESIZE]
                [--message sigma MESSAGESIGMA]  [-a SEED]
                [--publishtime PUBLISHTIME]     [--publishsigma PUBLISHSIGMA] [-d]
optional arguments:0
 -h, --help              show this help message and exit
 -c, --classical         enable classical encryption of messages
 -q, --quantum           enables post-quantum secure encryption of messages
 -n, --none              disables encryption of messages
 -m MONTECARLO,  --montecarlo MONTECARLO
                         Number Of MC runs to gather statistics of
 --Messagecount MESSAGECOUNT
                         Number of messages to exchange after key exchange
 --messagesize MESSAGESIZE
                         Average size of message in bytes to encrypt and send
 --massagesigma MESSAGESIGMA
                         Sigma of message in bytes to encrypt and send
 -a SEED,  --seed for MC sampling
 --publishtime PUBLISHTIME
                         Average time to publish public keys to chain
 --publishsigma PUBLISHSIGMA
                         Sigma of time to publish public keys to chain
 -d, --debug
[ec2-user@ec2lm-06b34be62 orchestrator]$
```

*FIG. 5*

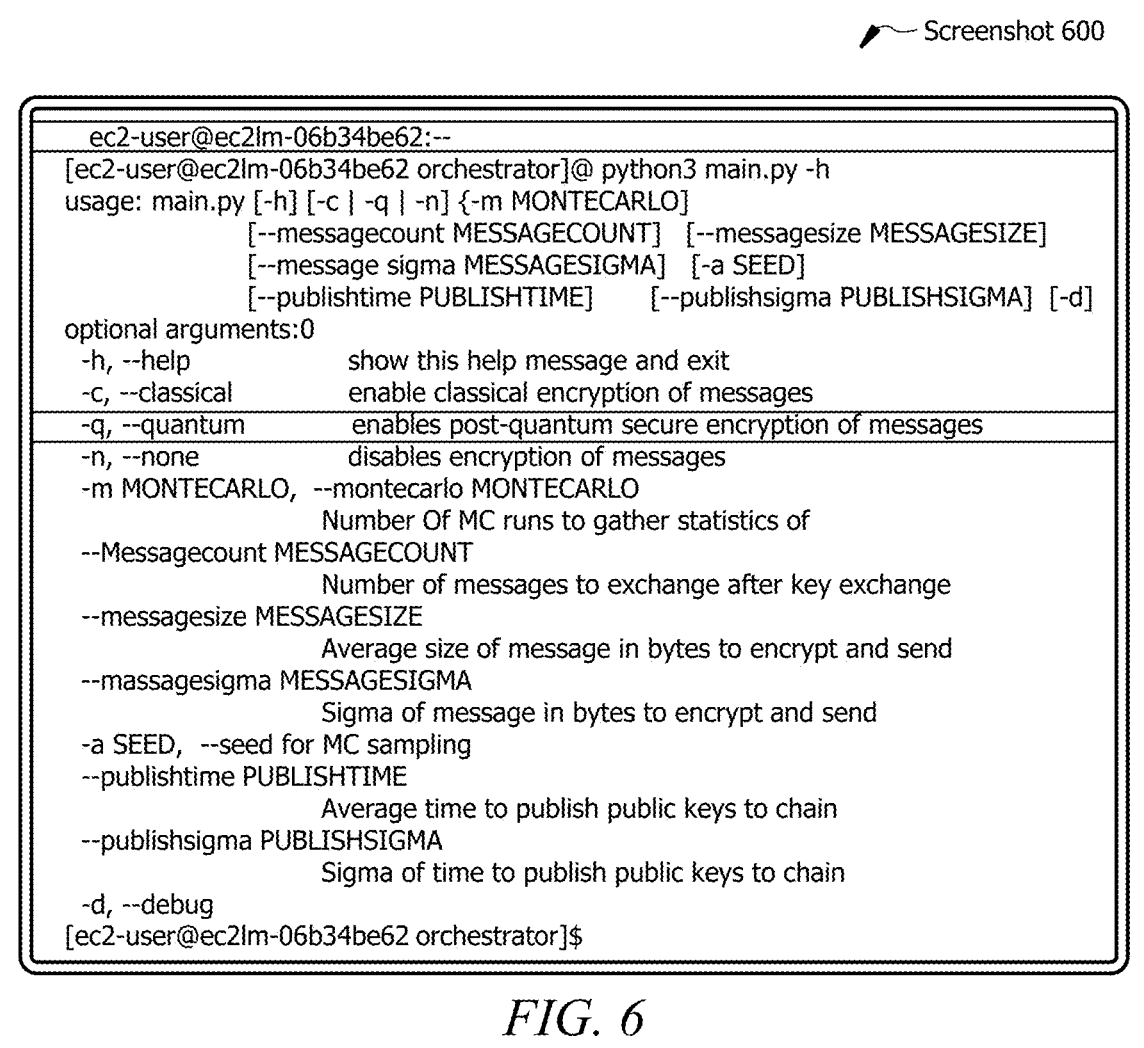

Screenshot 600

```
ec2-user@ec2lm-06b34be62:--
[ec2-user@ec2lm-06b34be62 orchestrator]@ python3 main.py -h
usage: main.py [-h] [-c | -q | -n] {-m MONTECARLO]
                [--messagecount MESSAGECOUNT]  [--messagesize MESSAGESIZE]
                [--message sigma MESSAGESIGMA]  [-a SEED]
                [--publishtime PUBLISHTIME]     [--publishsigma PUBLISHSIGMA] [-d]
optional arguments:0
 -h, --help              show this help message and exit
 -c, --classical         enable classical encryption of messages
 -q, --quantum           enables post-quantum secure encryption of messages
 -n, --none              disables encryption of messages
 -m MONTECARLO,  --montecarlo MONTECARLO
                         Number Of MC runs to gather statistics of
 --Messagecount MESSAGECOUNT
                         Number of messages to exchange after key exchange
 --messagesize MESSAGESIZE
                         Average size of message in bytes to encrypt and send
 --massagesigma MESSAGESIGMA
                         Sigma of message in bytes to encrypt and send
 -a SEED,  --seed for MC sampling
 --publishtime PUBLISHTIME
                         Average time to publish public keys to chain
 --publishsigma PUBLISHSIGMA
                         Sigma of time to publish public keys to chain
 -d, --debug
[ec2-user@ec2lm-06b34be62 orchestrator]$
```

*FIG. 6*

```
(
  "chain": [
(
"index": 1,
"previous_hash": "1",
"Proof": 100,
"timestamp": 1632141235.0857234,
"transactions: {}
), (
"index": 2.
"previous_hash::"9052a4fd098025e667b5Oab47366168fe513310b8b01238e747a4e0b6f0c2f43",
"proof": 35293,
"timestamp": 1632141253.692022,
"transactions": [
{
"amount": "-----BEGIN PUBLIC KEY-----\nMIICIjANBgkqkiG9w0BAQEFAA0CAg8AMIICCgkCAgEA3p45r,
"recipient": "all",
"sender": "984cfl6ld504a0c7ee22cdcf83395488d658abd5eb3c679cf7b5a9ddc7daf82a7964428348cb4
}, "amount": 1,
"recipient": "7e21753d166b4e8681713b718f25a84",
"sender": "0"
}
]
},
(
"index": 3,
"previous_hash": "c07a82d704622eef3d56e52fic209d750a425ff3a6fd58315fbf45cfe455eaf0",
"proof" : 35089,
"Timestamp": 1632141253.7556741,
"transactions": [
(
"amount": "-----BEGIN PUBLIC KEY-----\nMIICIjANBgkqhkiG9w0BAQEFAAOCAg8AMIICCgKCAgEAv4UgF?
"recipient": "all",
"sender": "e0fda0d83f1884cd1d548837551cbd533df288ba80bf1068cb547e05b2127b61502aa32f3f5f3:
},
{
"amount": 1,
"recipient": "7e21753d166b4e8681713b7181f25a84",
"sender": "0"
```

*FIG. 7*

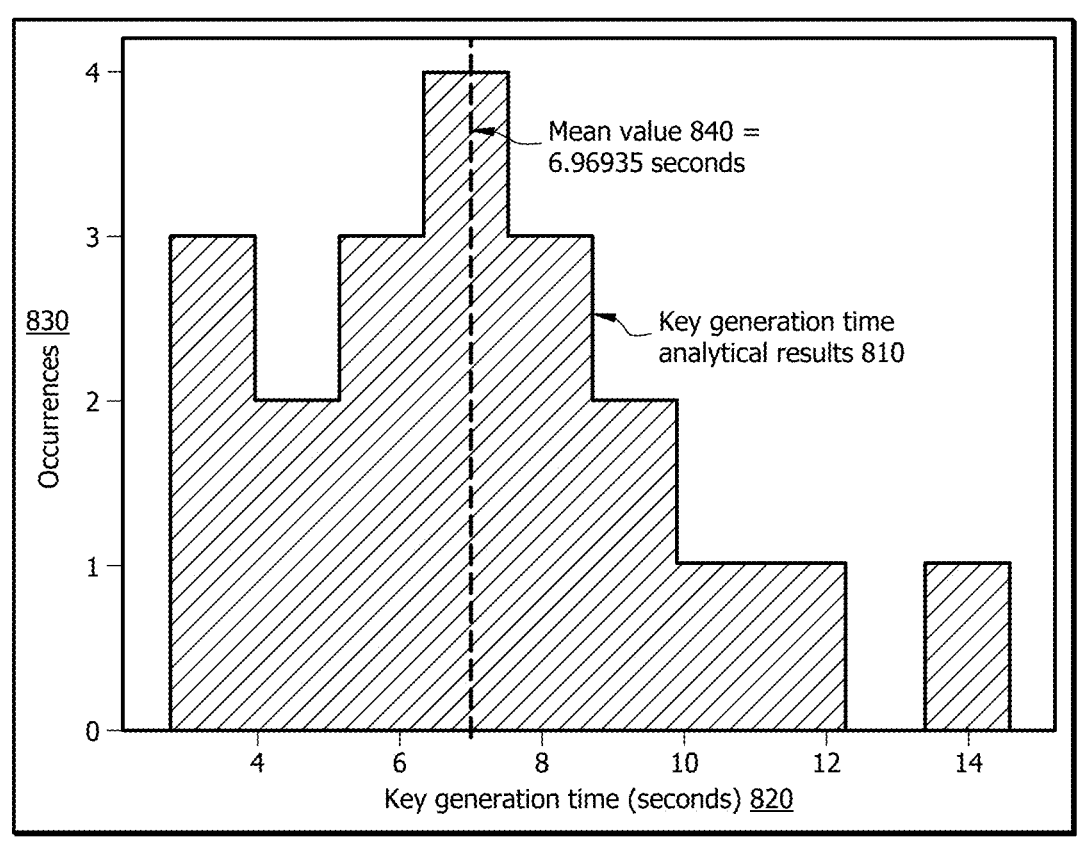
*FIG. 8*

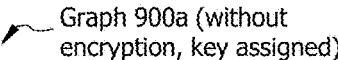
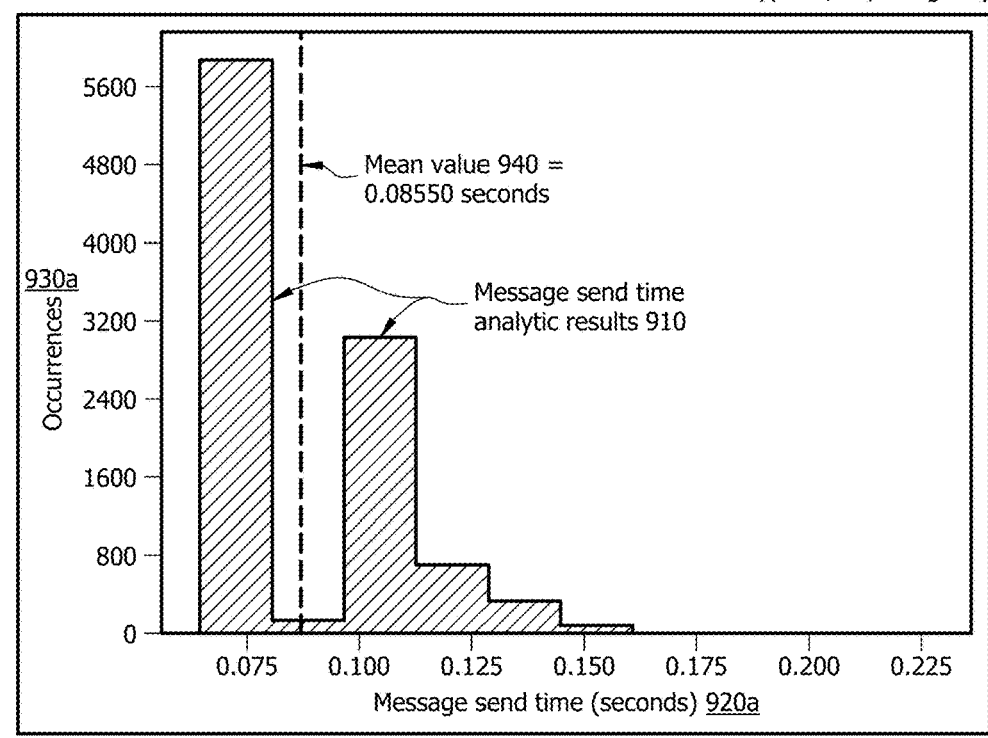
*FIG. 9A*
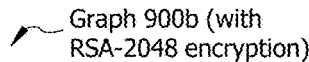
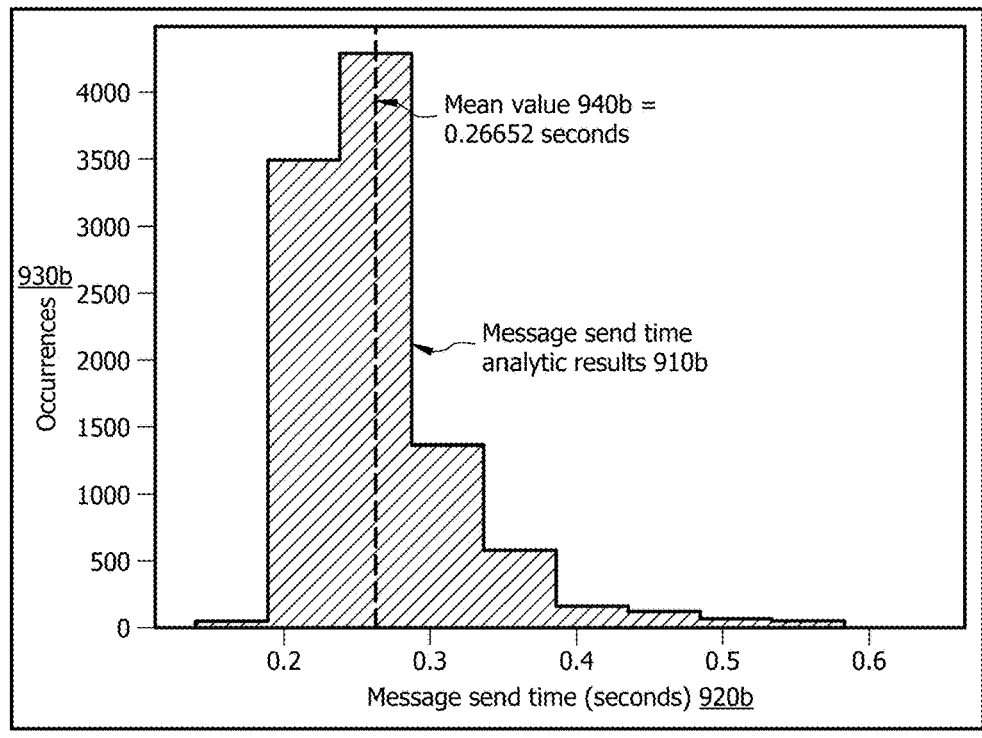
*FIG. 9B*

Graph 1000a (encryption)

Graph 1000b (decryption)

Screenshot 1100

```
# from pqcrypto.kem.firesaber import generate_keypair, encrypt, decrypt
# from pqcrypto.kem.frodokem1344aes import generate_keypair, encrypt, decrypt
# from pqcrypto.kem.frodokem1344shake import generate_keypair, encrypt, decrypt
# from pqcrypto.kem.frodokem640aes import generate_keypair, encrypt, decrypt
# from pqcrypto.kem.frodokem640shake import generate_keypair, encrypt, decrypt
# from pqcrypto.kem.frodokem976aes import generate_keypair, encrypt, decrypt
# from pqcrypto.kem.frodokem976shake import generate_keypair, encrypt, decrypt
# from pqcrypto.kem.kyber1024 import generate_keypair, encrypt, decrypt
# from pqcrypto.kem.kyber1024_90s import generate_keypair, encrypt, decrypt
# from pqcrypto.kem.kyber512 import generate_keypair, encrypt, decrypt
# from pqcrypto.kem.kyber512_90s import generate_keypair, encrypt. decrypt
# from pqcrypto.kem.kyber768 import generate_keypair, encrypt, decrypt
# from pqcrypto.kem.kyber768_90s import generate_keypair, encrypt, decrypt
# from pqcrypto.kem.lightsaber import generate_keypair, encrypt, decrypt
# from pqcrypto.kem.mceliece348864 import generate_keypair, encrypt, decrypt
# from pqcrypto.kem.mceliece348864f import generate_keypair, encrypt, decrypt
# from pqcrypto.kem.mceliece460896 import generate_keypair, encrypt, decrypt
# from pqcrypto.kem.mceliece460896f import generate_keypair, encrypt, decrypt
# from pqcrypto.kem.mceliece6688128 import generate_keypair, encrypt, decrypt
# from pqcrypto.kem.mceliece6688128f import generate_keypair, encrypt, decrypt
# from pqcrypto.kem.mceliece6960119 import generate_keypair, encrypt, decrypt
# from pqcrypto.kem.mceliece6960119f, import generate_keypair, encrypt, decrypt
from pqcrypto.kem.mceliece8192128 import generate_keypair, encrypt, decrypt
# from pqcrypto.kem.mceliece8192128f, import generate_keypair, encrypt, decrypt
# from pqcrypto.kem.ntruhps2048509 import generate_keypair, encrypt, decrypt
# from pqcrypto.kem.ntruhps2048677 import generate_keypair, encrypt, decrypt
# from pqcrypto.kem.ntruhps4096821 import generate_keypair, encrypt, decrypt
# from pqcrypto.kem.ntruhrss701 import generate_keypair, encrypt, decrypt
# from pqcrypto.kem.saber import generate_keypair, encrypt, decrypt

# Alice generates a (public, secret) key pair
public_key, secret key = generate_keypair()

# Bob derives a secret (the plaintext) and encrypts it with Alice's public key to produce a c
ciphertext, plaintext_original = encrypt(public_key)

# Alice decrypts Bob's ciphertext to derive the now shared secret
plaintext_recovered = decrypt(secret_key, ciphertext)

# Compare the original and recovered secrets in constant time
assert compare_digest(plaintext_original, plaintext_recovered)
```

*FIG. 11*

Code 1300

Code 1300a

```
import time
import socket
import string
import random message_count - 0
times = []
s = socket.socket()
s. settimeout(60)
s. connect(('20.0.60.150',8000))
while message count < 50000:
    try:
        m = ''.join(random.choice(string.ascii_lowercase) for i in range(256))
        s.send(''.join([m,'',',',str(time.time())]).encode())
        rcvdData = s.recv(1024).decode()
        print("N: {}".format(rcvdData))
        time_diff = time.time() - float(rcvdData.split(',')[I])
        print("Time: {}".format(time diff))
        times.append(time_diff)
        message_count += 1
    except socket.timeout:
        break
    except IndexError:
        break
s.close()
with open('times.txt', 'w') as f:
    for t in times:
        f.write(str(t)+"\n")
```

Sender node 1310a

Code 1300b

```
import time
import socket
import string
import random message_count = 0
times = {}
s = socket.socket()
s.settimeout(60)
port = 8000
s.bind(('',port))
s.listen(5)
c,addr = s.accept()
print("Socket up and running with connection from{}".format(addr))
while message count < 50000"
    try:
        rcvdData = c.recv(1024).decode()
        print("S: {}".format(rcvdData))
        time_diff = time.time() - float(rcvdData.split(','))[1])
        print("Time: {}.format(time_diff))
        times.append(time_diff)
        m = ''.join(random.choice(string.ascii_lowercase) for i in range(256))
        c.send(','.join([m,',',str(time.time())]).encode())
        message_count += 1
    except socket.timeout:
        break
    except IndexError:
        break
c.close()
with open('times.txt', 'w') as f:
    for t in times:
        f.write(str(t) + "\n")
```

Receiver node 1310b

*FIG. 13*

Method 1500

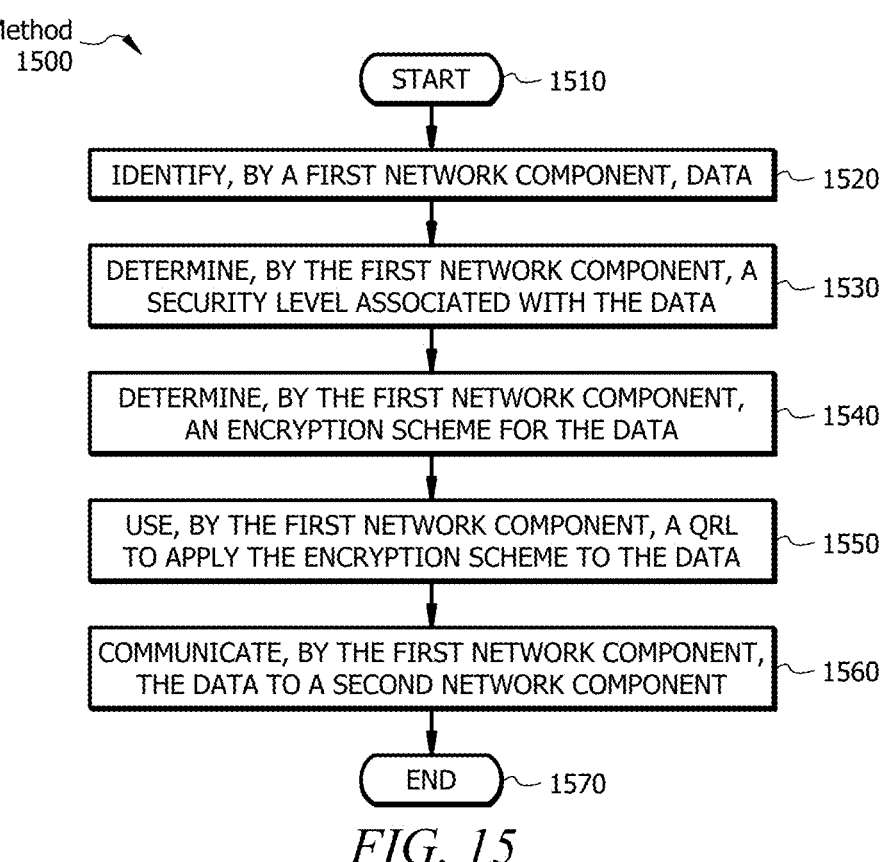

START — 1510

IDENTIFY, BY A FIRST NETWORK COMPONENT, DATA — 1520

DETERMINE, BY THE FIRST NETWORK COMPONENT, A SECURITY LEVEL ASSOCIATED WITH THE DATA — 1530

DETERMINE, BY THE FIRST NETWORK COMPONENT, AN ENCRYPTION SCHEME FOR THE DATA — 1540

USE, BY THE FIRST NETWORK COMPONENT, A QRL TO APPLY THE ENCRYPTION SCHEME TO THE DATA — 1550

COMMUNICATE, BY THE FIRST NETWORK COMPONENT, THE DATA TO A SECOND NETWORK COMPONENT — 1560

END — 1570

*FIG. 15*

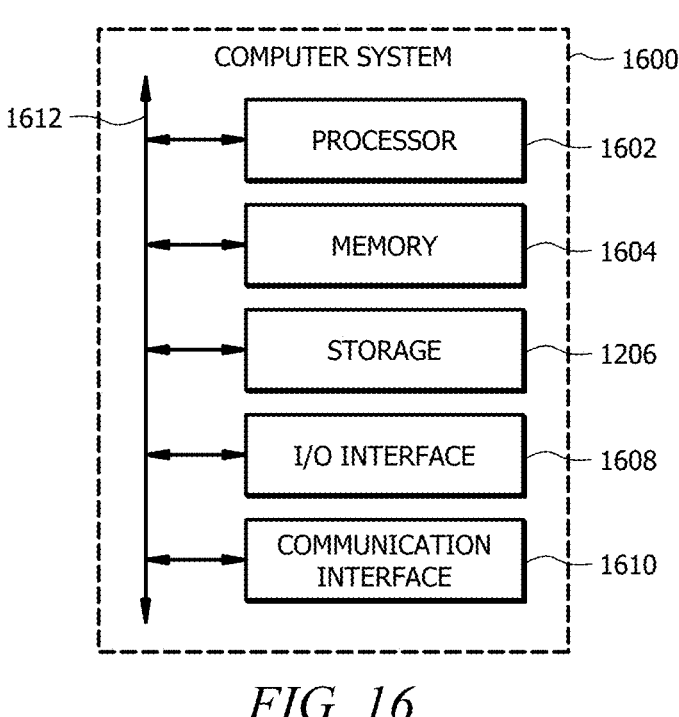

COMPUTER SYSTEM — 1600

1612

PROCESSOR — 1602

MEMORY — 1604

STORAGE — 1206

I/O INTERFACE — 1608

COMMUNICATION INTERFACE — 1610

*FIG. 16*

QUANTUM RESISTANT LEDGER FOR SECURE COMMUNICATIONS

PRIORITY

This nonprovisional application claims priority to U.S. Provisional Patent Application No. 63/369,406 filed Jul. 26, 2022, and entitled "QUANTUM RESISTANT LEDGER FOR SECURE COMMUNICATIONS," which is hereby incorporated by reference in its entirety.

TECHNICAL FIELD

The disclosure generally relates to secure communications, and more specifically to a quantum resistant ledger for secure communications.

BACKGROUND

The emerging 5G infrastructure allows for high throughput and low latency. Data encryption continues to be an Achilles' heel in this new environment. Quantum technology may defeat known encryption schemes (e.g., Rivest-Shamir-Adleman (RSA) 2048) using, for example, Shor's algorithm with quantum computers.

SUMMARY OF THE DISCLOSURE

According to some embodiments, a first network component includes one or more processors and one or more computer-readable non-transitory storage media coupled to the one or more processors and including instructions that, when executed by the one or more processors, cause the first network component to perform operations. The operations include identifying data and determining a security level from a plurality of security levels associated with the data. The operations also include determining an encryption scheme from a plurality of encryption schemes to apply to the data and applying, using a Quantum Resistant Ledger (QRL), the encryption scheme to the data to generate encrypted data. The operations further include communicating the encrypted data to a second network component.

In certain embodiments, the QRL represents a blockchain that includes a plurality of blocks. Each of the plurality of blocks may include a hash-based signature. In some embodiments, the encryption scheme is associated with one of the following: classical encryption, post-quantum encryption, or distributed ledger technology (DLT). In certain embodiments, the security level is associated with one of the following: an 80-bit security level, a 112-bit security level, a 128-bit security level, a 192-bit security level, or a 256-bit security level.

In certain embodiments, the operations include generating, using the QRL, a single public key and/or leveraging the single public key to generate public/private key pairs. In some embodiments, the operations include securing, using the QRL, signatures used for transactions. In certain embodiments, the operations include categorizing the first network component and the second network component in accordance with a role-based validation rule.

According to other embodiments, a method includes identifying, by a first network component, data and determining a security level from a plurality of security levels associated with the data. The method also includes determining an encryption scheme from a plurality of encryption schemes to apply to the data and applying, using a QRL, the encryption scheme to the data to generate encrypted data.

The method further includes communicating the encrypted data to a second network component.

According to other embodiments, one or more computer-readable non-transitory storage media embody instructions that, when executed by a processor, cause the processor to perform operations. The operations include identifying, by a first network component, data and determining a security level from a plurality of security levels associated with the data. The operations also include determining an encryption scheme from a plurality of encryption schemes to apply to the data and applying, using a QRL, the encryption scheme to the data to generate encrypted data. The operations further include communicating the encrypted data to a second network component.

Technical advantages of certain embodiments of this disclosure may include one or more of the following. In certain embodiments, the QRL described herein counters the potential advent of a sudden non-linear quantum computing advance. Certain embodiments of this disclosure do not require a quantum computer to deploy the Post Quantum Cryptography (PQC) solution, thereby making it very feasible. The QRL technology can be implemented on classical binary computers available today instead of waiting for quantum computers to mature. In certain embodiments, the QRL/Blockchain/DLT solutions operate on top of 5G/XG for better data protection in a military setting. The QRL solution may be applied at different levels of security for different quality of service (QoS) levels. In certain embodiments, the QRL solution described herein leverages government validated post-quantum encryption schemes to enhance data security and integrity. Certain embodiments described herein secure communications in an enterprise IP and 5G environments.

In certain embodiments, quantum resistant DLT is layered on top of the XG network architecture, which ensures high throughput, low latency, and secure communications. Certain embodiments of this disclosure use low power, high frequency bandwidths, which allows for better Low Probability of Intercept/Detection (LPI/LPD) in a contested/congested environment. DLT may be layered on top of the radio frequency (RF) oriented secure exchange schemes. In certain embodiments, DLT leverages blockchain architecture and is coupled with advanced quantum-resistant encryption (as described herein). This later feature enhances the immutable nature of a traditional blockchain architecture. Certain embodiments described herein are scalable and can accommodate blockchain as it moves toward a proof-of-stake security (PoS) scheme that allows for a high transaction rate. This fits in the fire-control loop environment, as many sensors emit at high update rates. By adapting the quantum resistant ledger concept described herein, sensitive data can be distributed, ensuring data confidentiality, integrity, and availability (C-I-A).

Blockchain's built in characteristics (e.g., immutability and traceability) provide users with a means to ensure data integrity. When paired with QRL running post-quantum encryption, data becomes even more secure. The 51 percent rule in blockchain and the consensus protocol in QRL enhance confidentiality. Given that both public and private blockchain consist of multiple nodes, users can make a node under attack redundant and continue to operate business as usual. Thus, even if a major part of the blockchain network is under attack, the blockchain network will continue to operate due to the distributed nature of the technology. Additionally, if an attacker gains access to a blockchain network and the data, this does not necessarily mean the attacker can read or retrieve the information. Full encryption of the data blocks may be applied to data being transacted, effectively guaranteeing its confidentiality.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

FIG. 4 illustrates a screenshot showing QRL key creation, in accordance with certain embodiments.

FIG. 5 illustrates a screenshot showing classical encryption, in accordance with certain embodiments.

FIG. 6 illustrates a screenshot showing post-quantum encryption, in accordance with certain embodiments.

FIG. 7 illustrates a screenshot showing blockchain implementation, in accordance with certain embodiments.

FIG. 8 illustrates a graph of key generation time analytical results, in accordance with certain embodiments.

FIGS. 9A and 9B illustrate graphs of analytical results for message send times with versus without an encryption key assigned, in accordance with certain embodiments.

FIG. 11 illustrates a screenshot of post-quantum encryption results, in accordance with certain embodiments.

FIG. 13 illustrates code showing python Transmission Control Protocol (TCP) socket message exchange of a given length, in accordance with certain embodiments.

FIG. 15 illustrates a method for using a QRL for secure communications, in accordance with certain embodiments.

FIG. 16 illustrates a computer system, in accordance with certain embodiments.

DETAILED DESCRIPTION OF THE DISCLOSURE

Embodiments of this disclosure describe a PQC solution called QRL. PQC and blockchain/DLT together are combined to leverage advanced encryption algorithms from PQC and the immutability feature from Blockchain/DLT. This blended QRL and National Institute of Standards and Technology (NIST)-compliant PQC solution resists the Shor's integer factorization quantum attack scheme. Since many Manned-unmanned teaming (MUM-T) use cases are typically short range in nature (e.g., having an autonomous wingman next to a human-piloted aircraft), 5G/Next Generation (XG) can use low power, high frequency bandwidths to communicate between platforms. While certain types of waveforms provide low probability intercept (LPI)/low probability detect (LPD) capabilities in a contested/congested environment at the physical radio frequency (RF) layer, there is no such encryption at the data layer.

The QRL approach described herein uses any number of encryption approaches, such as Kyber for key encryption and Dilithium for digital signatures. Both Kyber and Dilithium are industry and Department of Defense (DoD) compliant. Both Kyber and Dilithium offer larger key sizes than other schemes, so higher transaction rates can be achieved in a 5G or XG use case. Since 5G and XG each provide a layered architecture (similar to 7-layer Open Systems Interconnection (OSI) architecture for network), the QRL runs like any software application and will be transparent to the end users.

QRL is a blockchain with hash-based signatures for the blocks. In certain embodiments, QRL mitigates quantum advances through one time signature (OTS). QRL leverages a single public key, and QRL generates subsequent public/ private key pairs after that. In certain embodiments, QRL leverages the Merkle Tree Signature Scheme (MTSS), which is digital signature scheme formalized by NIST SP 800-208. QRL secures signatures used for transactions against brute forcing by quantum advances and/or Grover's Algorithm. For example, quantum computers are advantageous for integer factorization. However, selected approaches disclosed herein (e.g., Kyber and Dilithium algorithms) do not rely on integer factorization for encryption.

QRL supports different forms of consensus models (e.g., proof-of-work (PoW), proof-of-stake (PoS), etc.). For example, QRL supports new protocols such as the RandomX PoW algorithm. To allow a higher transaction rate, QRL can be set up as a PoS architecture. QRL allows secure communications via on-chain lattice key creation/storage.

Figure 1:
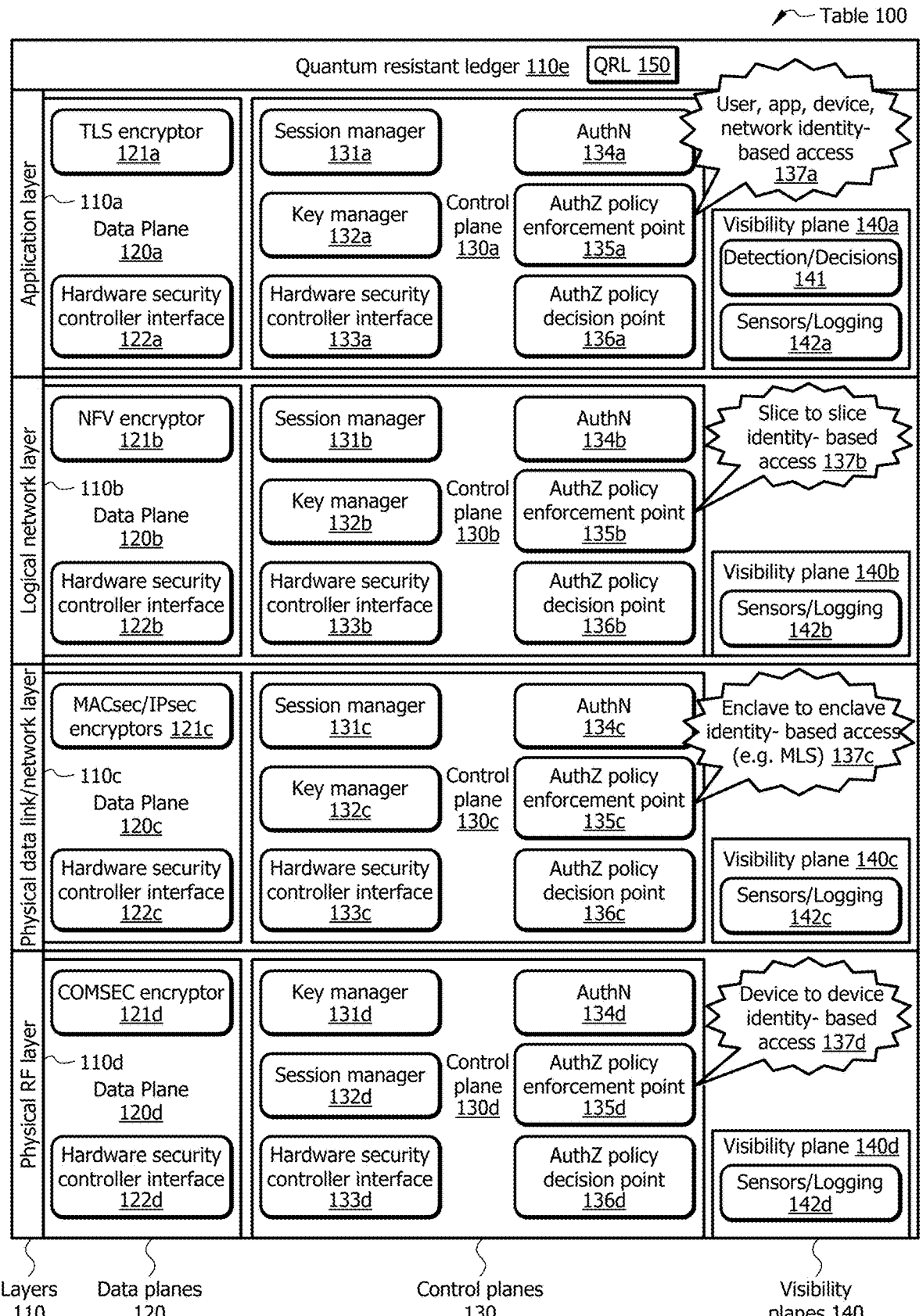
FIG. 1 illustrates a table showing layers of encryption, in accordance with certain embodiments.

FIG. 1 illustrates a table 100 showing layers of encryption, in accordance with certain embodiments. The illustrated embodiment of FIG. 1 includes the following layers 110: an application layer 110a, a logical network layer 110b, a physical data link/network layer 110c, a physical RF layer 110d, and a QRL layer 110e. Layers 110a through 110d each include a data plane 120, a control plane 130, and a visibility plane 140. Specifically, application layer 110a includes a data plane 120a, a control plane 130a, and a visibility plane 140a. Logical network layer 110b includes a data plane 120b, a control plane 130b, and a visibility plane 140b. Physical data link/network layer 110c includes a data plane 120c, a control plane 130c, and a visibility plane 140c. And physical RF layer 110d includes a data plane 120d, a control plane 130d, and a visibility plane 140d.

Data planes 120 of table 100 include encryptors 121 and hardware security controller interfaces 122. Specifically, data plane 120a of application layer 110a includes a Transport Layer Security (TLS) encryptor 121a and a hardware security controller interface 122a. Data plane 120b of logical network layer 110b includes a Network Function Virtualization (NFV) encryptor 121b and a hardware security controller interface 122b. Data plane 120c of physical data link/network layer 110c includes Media Access Control security (MACsec)/Internet Protocol Security (IPsec) encryptors 121c and a hardware security controller interface 122c. And data plane 120d of physical RF layer 110d includes a communications security (COMSEC) encryptor 121d and a hardware security controller interface 122d.

In the illustrated embodiment of FIG. 1, each control plane 130 of each layer 110 includes a session manager 131, a key manager 132, a hardware security controller interface 133, an authentication (AuthN) 134, an authorization (AuthZ) policy enforcement point 135, and an AuthZ policy decision point 136. Specifically, control plane 130a of application layer 110a includes a session manager 131a, a key manager 132a, a hardware security controller interface 133a, an AuthN 134a, an AuthZ policy enforcement point 135a, and an AuthZ policy decision point 136a. Control plane 130b of logical network layer 110b includes a session manager 131b, a key manager 132b, a hardware security controller interface 133b, an AuthN 134b, an AuthZ policy enforcement point 135b, and an AuthZ policy decision point 136b. Control plane 130c of physical data link/network layer 110c includes a session manager 131c, a key manager 132c, a hardware security controller interface 133c, an AuthN 134c, an AuthZ policy enforcement point 135c, and an AuthZ policy decision point 136c. And control plane 130d of physical RF layer 110d includes a session manager 131d, a key manager 132d, a hardware security controller interface 133d, an AuthN 134d, an AuthZ policy enforcement point 135d, and an AuthZ policy decision point 136d.

AuthZ policy enforcement point 135a located in control plane 130a of application layer 110a provides user, application, device, and network identity-based access 137a. AuthZ policy enforcement point 135b located in control plane 130b of logical network layer 110b provides slice-to-slice identity-based access 137b. AuthZ policy enforcement point 135c located in control plane 130c of physical data link/network layer 110c provides enclave-to-enclave identity-based access (e.g., MLS) 137c. AuthZ policy enforcement point 135d located in control plane 130d of physical RF layer 110d provides device-to-device identity-based access 137d.

Visibility planes 140 of layers 110 include detection/decisions 141 and sensors/logging 142. Specifically, visibility plane 140a of application layer 110a includes detection/decisions 141 and sensors/logging 142a. Visibility plane 140b of logical network layer 110b includes sensors/logging 142b. Visibility plane 140c of physical data link/network layer 110c includes sensors/logging 142c. And visibility plane 140d of physical RF layer 110d includes sensors/logging 142d.

As illustrated in FIG. 1, QRL 150 of QRL layer 110e is unique due to its flexibility. Within the communications and networking domains, there can be many layers of encryption. For example, within the OSI physical layer (e.g., physical RF layer 110d), COMSEC encryption (e.g., by COMSEC encryptor 121d) is very common in the physical domain. MACsec and/or IPSec (e.g., by MACSec/IPSec encryptors 121c) are typical encryptions found at the data link or network layers (e.g., physical data link/network layer 110c). NFV encryptions (e.g., by NFV encryptor 121b) are popular at logical network layer 110b. And at application layer 110a, TLS encryption (e.g., by TLS encryptor 121a) may be present to enhance data security. These encryptions may be run independent from each other with no interference of each other's performance. QRL 150 can be seen as another layer of security running on top of these layers. Systems and/or security engineers may use QRL 150 in absence or in conjunction with any of these other encryptions residing at different layers.

In certain embodiments, QRL 150 allows PQC algorithms to be swapped depending on the use case. PQC algorithms may use the following approaches: lattice-based cryptography (e.g., NTRU encryption schemes, Goldreich-Goldwasser-Halevi (GGH) encryption schemes, NTRU signature encryption schemes, BLISS signature encryption schemes, etc), multivariate cryptography (e.g., Rainbow schemes), hash-based cryptography (e.g., Lamport signatures, the Merkle signature scheme, the Extended Merkle signature scheme (XMSS), the SPHINCS, the WOTS scheme, etc.), code-based cryptography (e.g., the McEliece encryption algorithm, the Niederreiter encryption algorithm, the Courtois, Finiasz and Sendrier Signature scheme, etc.), isogeny-based cryptography (e.g., the Diffie-Hellman-like key exchange CSIDH, the elliptic curve Diffie-Hellman key-exchange methods, etc.), symmetric key quantum resistance (e.g., Advanced Encryption Standard (AES) and SNOW 3G, etc.), and/or any other suitable approach.

Each approach has its own benefits and shortcomings. For example, some approaches perform better than others in certain conditions, some approaches have larger or smaller key sizes, etc. Hence, the real encryption world is not a one-size-fits-all. QRL 150 has the flexibility to accommodate for different PQC algorithms, which allows the algorithms to evolve independently over time and not have an interoperability issue with QRL 150 itself.

In the 5G use case, some PQCs will likely have performance advantages over others in terms of resource overhead, delay time, encryption/decryption power requirements, etc. This opens the door for fine-tuning a given PQC for different application use case scenarios within the 5G context. With the implementation of QRL layer 110e, different security levels may be allowed as a function of quality of service (QoS).

Figure 2:
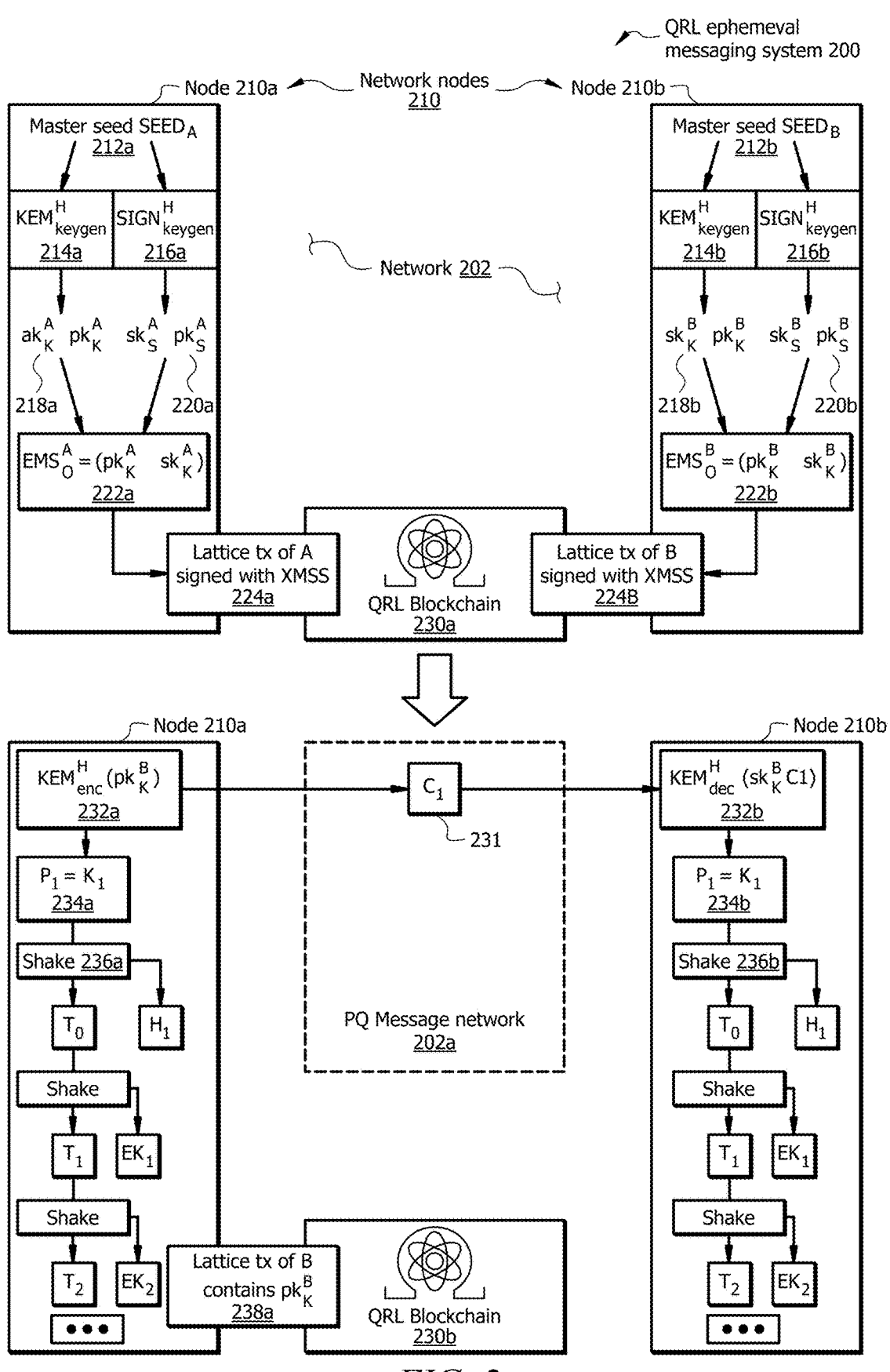
FIG. 2 illustrates a QRL ephemeral messaging system, in accordance with certain embodiments.

FIG. 2 illustrates a QRL ephemeral messaging system 200, in accordance with certain embodiments. QRL ephemeral messaging system 200 of FIG. 2 includes a network 202, network nodes 210, master seeds 212, KEMs 214, signature mechanisms 216, KEM key pairs 218, signature key pairs 220, exporter master secrets 222, and lattice transmissions 224. Specifically, node 210a of network nodes 210 includes a master seed 212a, a KEM 214a (KEM$^H_{keygen}$), a signature mechanism 216a (SIGN$^H_{keygen}$), a KEM key pair 218a (sk$^A_K$, pk$^A_K$), a signature key pair 220a (sk$^A_S$, pk$^A_S$), an exporter master secret 222a (EMS$^A_O$=pk$^A_K$·sk$^A_K$), and a lattice transmission 224a (lattice tx of A signed with XMSS). Node 210b of network nodes 210 includes a master seed 212b, a KEM 214b (KEM$^H_{keygen}$), a signature mechanism 216b (SIGN$^H_{keygen}$), a KEM key pair 218b (sk$^B_K$, pk$^B_K$), a signature key pair 220b (sk$^B_S$, pk$^B_S$), an exporter master secret 222b (EMS$^B_O$=pk$^B_K$·sk$^B_K$), and a lattice transmission 224b (lattice tx of B signed with XMSS).

Network 202 of QRL ephemeral messaging system 200 is any type of network that facilitates communication between components of QRL ephemeral messaging system 200. Network 202 may connect one or more components of QRL ephemeral messaging system 200. One or more portions of network 202 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 202 may include one or more different types of networks. Network 202 may be any communications network, such as a private network, a public network, a connection through the Internet, a mobile network, a Wi-Fi network, etc. Network 202 may include a core network (e.g., a 5G core network), an access network of a service provider, an Internet service provider (ISP) network, and the like. One or more components of QRL ephemeral messaging system 200 may communicate over network 202. Network 202 of QRL ephemeral messaging system 200 includes a post-quantum (PQ) message network 202a.

Network nodes 210 of QRL ephemeral messaging system 200 are connection points within network 202 that receive, create, store and/or send data along a path. Network nodes 210 may include one or more redistribution points that recognize, process, and forward data to other nodes of network 202. Network nodes 210 may include virtual and/or physical nodes. For example, network nodes 210 may include one or more physical devices, virtual machines (VMs), bare metal servers, and the like. As another example, network nodes 210 may include data communications equipment such as computers, routers, servers, printers, devices, workstations, switches, bridges, modems, hubs, and the like.

In the illustrated embodiment of FIG. 2, network nodes 210 (node 210a and node 210b) are set up in a virtual environment for testing purposes. Node 210a is the sender, and node 210b is the receiver. QRL ephemeral messaging system 200 is created to pass data (e.g., messages) between node 210a and node 210b. This configuration allows for a quantitative measurement of the network traffic metric and encryption times. Specific Measures of Effectiveness (MOE) are used to gauge the effectiveness of this QRL solution.

Master seeds 212 of QRL ephemeral messaging system 200 represent n-byte strings that are used to generate keys. In certain embodiments, master seeds 212 are public information. In the illustrated embodiment of FIG. 2, master seed 212a (SEED A) is assigned to node 210a, and master seed 212b (SEED B) is assigned to node 210b. In certain embodiments, master seeds 212 are used to generate KEM key pairs 218 and signature key pairs 218 based on selected encryption schemes.

The QRL approach described herein may use any number of encryption schemes. Encryption schemes may include classical encryption schemes (e.g., RSA-2048), post-quantum encryption schemes (e.g., Kyber-1024), DLT/blockchain encryption schemes, and the like. In certain embodiments, encryption schemes include KEMs 214 and signature mechanisms 216.

KEMs 214 may include one or more of the following: Classic McEliece, Cryptographic Suite for Algebraic Lattices (CRYSTALS) Kyber, the NTRU encryption algorithm (NTRUEncrypt), SABER, or any other suitable KEM. In the embodiment of FIG. 2, the user selected Kyber for KEM 214a to use within QRL ephemeral messaging system 200.

Signature mechanisms 216 may include one or more of the following: Falcon, CRYSTALS Dilithium, Rainbow, or any other suitable digital signature scheme. In the embodiment of FIG. 2, the user selected Dilithium for signature mechanisms 216a and 216b to use within QRL ephemeral messaging system 200.

KEM key pairs 218 (e.g., KEM key pair 218a and KEM key pair 218b) of QRL ephemeral messaging system 200 represent Kyber public/private key pairs. In certain embodiments, the private/secret key (sk) of each signature key pair 218 is used to generate the key, and the public key (pk) of each signature key pair 218 is used to verify the key.

Signature key pairs 220 (e.g., signature key pair 220a and signature key pair 220b) of QRL ephemeral messaging system 200 represent Dilithium public/private key pairs. In certain embodiments, the private/secret key (sk) of each signature key pair 220 is used to generate the digital signature, and the public key (pk) of each signature key pair 220 is used to verify the digital signature.

Ephemeral messaging systems 222 of QRL ephemeral messaging system 200 represent values derived from KEM key pairs 218 and signature key pairs 220. For example, EMS 222a (EMS$^A_O$) for node 210a is generated by multiplying the public keys pk$^A_K$ and pk$^A_S$ generated by KEM 214a and signature mechanism 216a, respectively, and EMS 222b (EMS$^B_O$) for node 210b is generated by multiplying the public keys pk$^B_K$ and pk$^B_S$ generated by KEM 214b and signature mechanism 216b, respectively.

Lattice transmissions 224 of QRL ephemeral messaging system 200 are the transmissions from network nodes 210 to QRL blockchain 230 that are signed with XMSS. In QRL ephemeral messaging system 200, lattice transmission 224a of node 210a and lattice transmission 224b of node 210b, which are signed with XMSS, are communicated to QRL blockchain 230.

In the illustrated embodiment of FIG. 2, QRL blockchain 230 is a blockchain/DLT that is run on top of QRL (e.g., QRL 150 of FIG. 1). As shown in FIG. 2, users may utilize public keys (pk) and private/secret keys (sk) to digitally sign and securely transact within QRL ephemeral messaging system 200. In certain embodiments, a blockchain is a distributed database with a list (or a chain) of records (or blocks) linked and secured by digital fingerprints (e.g., cryptographic hashes). Hashing is a method of applying a cryptographic hash function to data. In some embodiments, hashing calculates a relatively unique output (called a message digest, or just digest) for an input (e.g., a file, text, or image) of nearly any size. Hashing allows users to independently take input data, hash that data, and derive the same result to prove that there was no change in the data. Even the smallest change to the input (e.g., changing a single bit) will result in a completely different output digest. A hash (e.g., eb8ecbf6d5870763ae246e37539d82e37052cb32f88bb8c5-9971f9978e437743) is a small digest checksum calculated with a one-way crypto hash digest checksum function (e.g., Secure Hash Algorithm (SHA) 256 Bits) from the data. In certain embodiments, the blockchain algorithm uses a block timestamp (e.g., 1637-09-15 20:52:38), a hash from the previous block (e.g., edbd4e11e69bc399a9ccd8faaea-44fb27410fe8e3023bb9462450a0a9c4caalb), and block data (e.g., transaction data).

In PQ message network 202a, node 210a uses an encryption algorithm 232a (KEM$^H_{enc}$ (pk$^B_K$)) that on input of node 210b's public key (pk$^B_K$) and a message outputs ciphertext 231 (C$_1$). Ciphertext 231 is communicated to node 210b via PQ message network 202a. Node 210b uses a decryption algorithm 232b (KEM$^H_{dec}$ (sk$^B_K$·C$_1$) that on input of node 210b's secret key (sk$^B_K$) and ciphertext 231 (C1) outputs a message. Node 210a and node 210b now both have access to P1 and K1 (234a for node 210a and 234b for node 210b) of the message. P$_1$ represents the plain text space or clear text space of the message, C1 represents the cypher text space, and K$_1$ represents the key space. The messages are then hashed using a hash algorithm (e.g., Secure Hash Algorithm and KECCAK (SHAKE)). As illustrated in FIG. 2, lattice transmission 238a from node 210a to QRL blockchain 230 includes the public key (pk$^B_K$) of node 210b.

Figure 3:
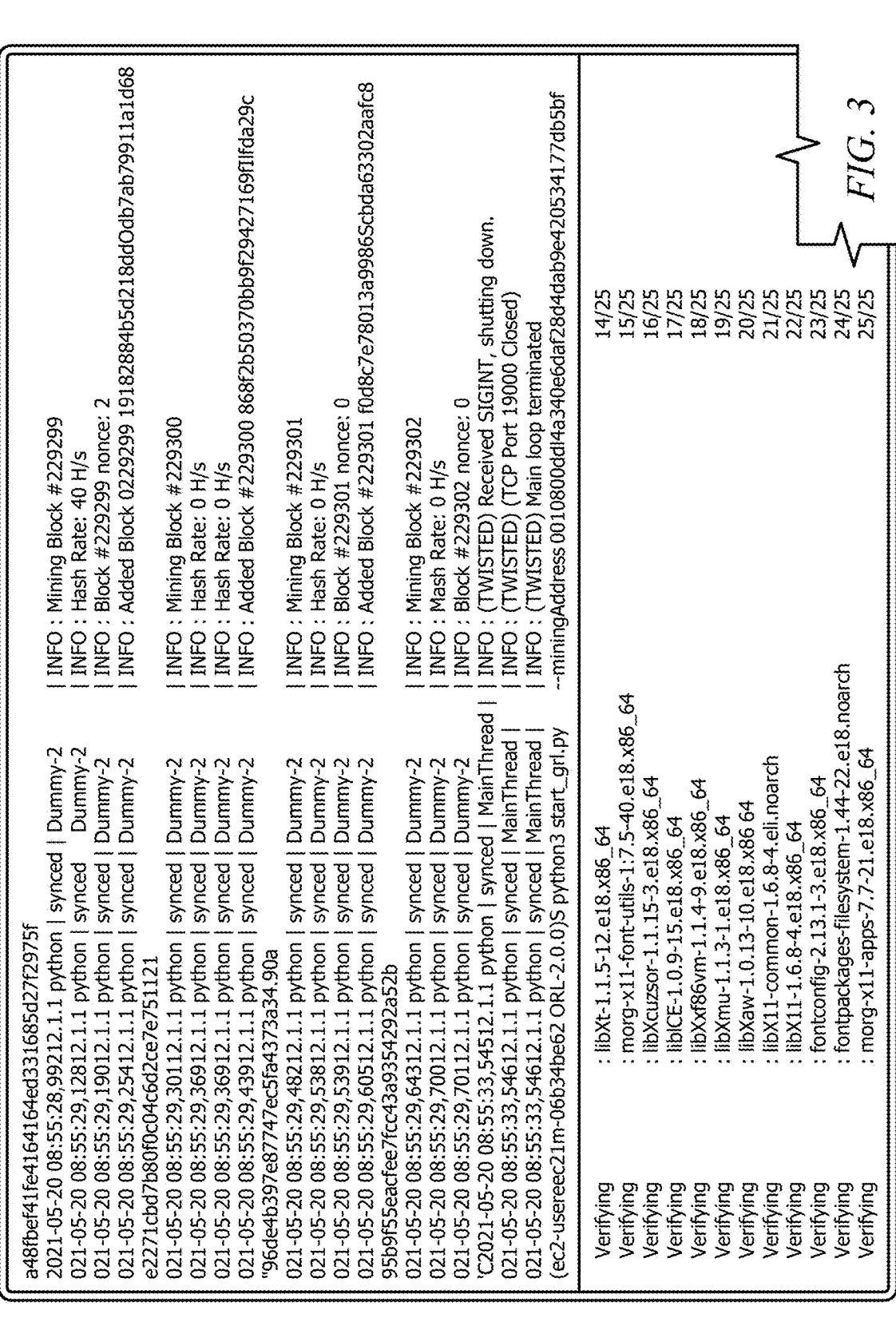
FIG. 3 illustrates a screenshot of executing a QRL on a command line interface (CLI), in accordance with certain embodiments.

FIG. 3 illustrates a screenshot 300 of executing QRL (e.g., QRL 150 of FIG. 1) on a command line interface (CLI), in accordance with certain embodiments. In certain embodiments, QRL is provided with a CLI, where end users can execute specific commands for development and testing purposes. Screenshot 300 of FIG. 3 includes hashes (e.g., a48fbef41fe4164164ed331685d27f2975f), block timestamps (e.g., 2021-05-20 08:55:28), the programming language used (e.g., Python), mining block identifiers (e.g., #229299), hash rates (e.g., 40 hashes/second), nonces (e.g., 2), a hash from the previous block (e.g., 19182884b5d218ddOdb7ab79911a1d68), as well as other block data.

FIG. 4 illustrates a screenshot 400 showing QRL key creation, in accordance with certain embodiments. After successful installation and implementation of QRL (e.g., QRL 150 of FIG. 1), keys are created. The keys include an XMSS key 410, an Elliptic Curve Digital Signature Algorithm (ECDSA) key 420, Kyber keys 430, and Kilithium keys 440. XMSS key 410 is used to generate ECDSA key 420.

FIG. 5 illustrates a screenshot 500 showing classical encryption, in accordance with certain embodiments. Once a key (e.g., ECDSA key 420 of FIG. 4) is created, classical encryption may be used to encrypt data (e.g., messages) in a virtual environment. In the illustrated embodiment of FIG. 5, classical encryption is enabled without errors.

FIG. 6 illustrates a screenshot 600 showing post-quantum encryption, in accordance with certain embodiments. In addition to classical encryption, QRL allows end users the option to run post-quantum secure encryption of messages. This is important because it allows users to compare quantitatively between the classical and post-quantum encryption performance. The expectation was that post-quantum encryption should take longer because of the complexity of the scheme. In potential use cases for 5G and 21st century warfare, there may be instances where users (e.g., operators, administrators, software engineers, etc.) need to have different levels of security. Post-quantum encryption is more secure than classical encryption but at the expense of performance penalty. This corresponds to the concept of network slicing in 5G.

FIG. 7 illustrates a screenshot 700 showing a blockchain implementation, in accordance with certain embodiments. For certain classes of applications (or traffic) that require a higher level of security, users (e.g., operators, administrators, software engineers, etc.) may decide to run Blockchain/DLT on top of QRL. FIG. 7 shows the recipient as "all," which means the sender node (e.g., node 210a of FIG. 2) is broadcasting the block to every node on the private network. The key, as indicated in screenshot 700, has been encrypted. In this embodiment, only the nodes that possess the right key can decrypt the hashed block. Some nodes may have permission to read the ledger, while other nodes may have permission to both read and write to the ledger. The read-only nodes, while they may be compromised by a quantum computer, do not have the ability to write to the ledger.

Blockchains have no single point of failure, which highly decreases the chances of an IP-based Distributed Denial of Service (DDoS) attack disrupting the normal operation. If a node is taken down, data is still accessible via other nodes within the network since all of them maintain a full copy of the ledger at all times. The distributed nature of the technology solves the Byzantine General's problem of false consensus. As an example, the well-publicized Bitcoin survived multiple DDoS attacks over its decade old history. Blockchain infrastructure provides a further level in data accessibility, given that data is accessible through any of the nodes in the network, even in the event of a DDoS attack disrupting some of the nodes.

In certain embodiments, blockchain networks are categorized based on their permission models. A permission model determines who can maintain the blockchain (e.g., publish blocks). For a transaction to be valid in a permissioned blockchain environment, both the transmitter and the block information need to be validated before the new block becomes part of the existing blockchain. In certain embodiments, a validation rule is used to add additional source code to check whether the sender nodes have the privilege to push data to the distributed data environment where all the other nodes can receive the same data hash. In some embodiments, a role-based validation rule is used, which is based on the roles of the nodes. While it is feasible to set up the rules where every node that belongs to the blockchain group can both send and receive data, it is less likely that this is how it works on a platform or mission system where there are only a handful of nodes that play the role of a data source. Nonetheless, it may be beneficial in certain embodiments to categorize nodes based on their roles within an organization. Even if this role-based validation rule is not needed for a given application, it is helpful in managing the network from an efficiency standpoint.

FIG. 8 illustrates a graph 800 of key generation time analytical results 810, in accordance with certain embodiments. In the initial setup for the key generation time analysis, tests via local loopback were conducted in a VM environment. Once QRL (e.g., QRL 150 of FIG. 1) was running properly, two Amazon Elastic Compute Cloud (EC2) servers were used as end points. The servers included two different network interface cards (NIC) instead of the internal loopback, which only included one NIC. Key generation time analytical results 810 captured in FIG. 8 illustrate a key generation time 820 for a Monte Carlo set of 20 runs/occurrences 830. As expected, there were some variances depending on the central processing unit (CPU) and memory usage at any given moment. Mean value 840 for key generation time 820 of 20 runs/occurrences 830 was 6.97 seconds. The highest key generation time 820 was 14 seconds.

FIGS. 9A and 9B illustrates graphs 900 of analytical results 910 for message send times 920 with versus without an encryption key assigned, in accordance with certain embodiments. Message send time analytical results 910 captured in FIGS. 9A and 9B illustrate message send times 920 for a Monte Carlo set of 10,000 runs/occurrences 930. As illustrated in graph 900a of FIG. 9A, when the messages were sent without encryption, mean value 940a for message send time 920a of 10,000 runs/occurrences 930a was 0.086 seconds. As illustrated in graph 900b of FIG. 9B, when the same test was repeated but with RSA-2048 encryption, mean value 940b for message send time 920b of 10,000 runs/occurrences 930b became 0.27 seconds. This aligns to the qualitative expectation that the group of runs without encryption should be sent quicker than those with encryption because of the additional overhead resources being spent on encrypting the messages themselves.

Figure 10A:
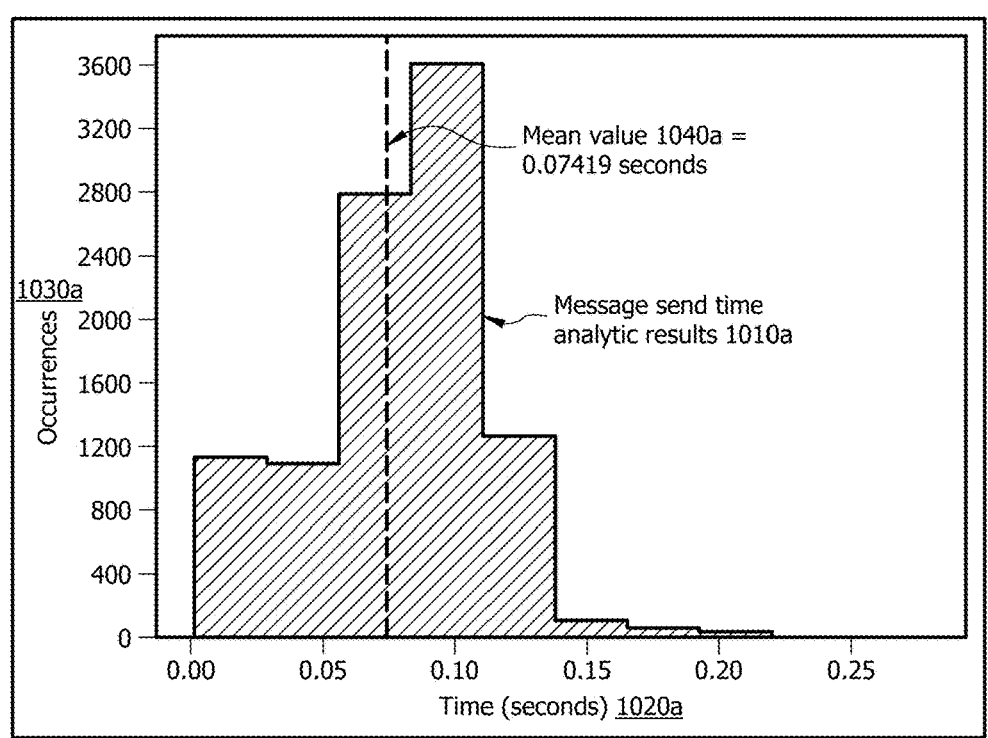
FIGS. 10A and 10B illustrate graphs of analytical results showing classical encryption versus decryption of messages, in accordance with certain embodiments.
Figure 10B:
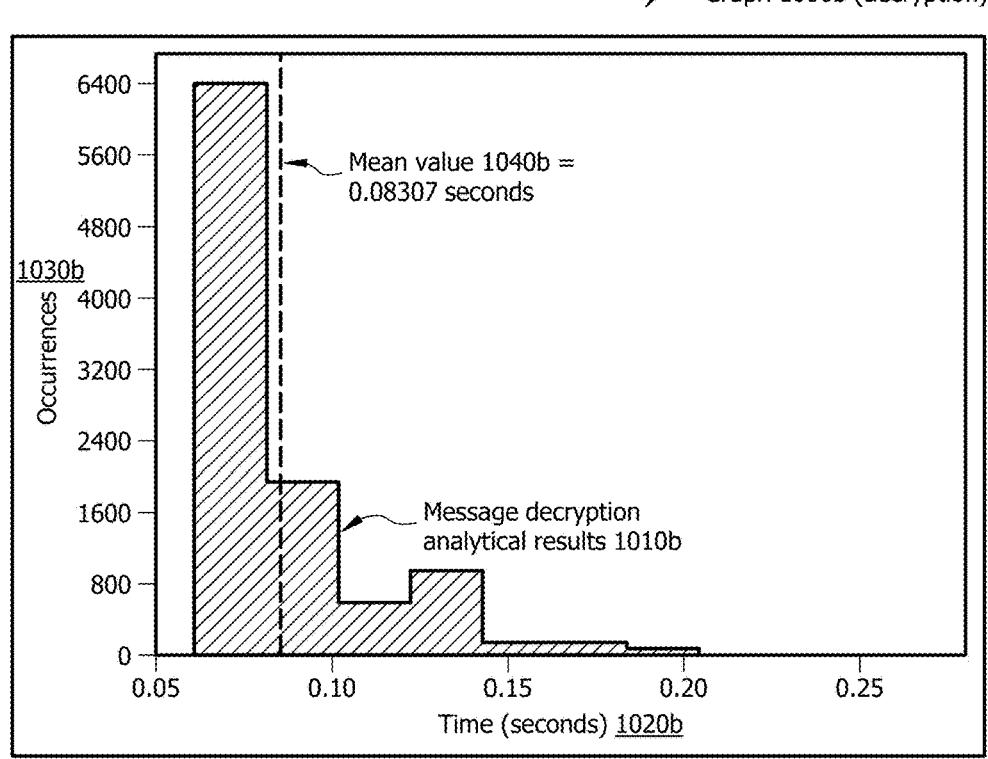

FIGS. 10A and 10B illustrate graphs 1000 of analytical results 1010 showing classical encryption versus decryption of messages, in accordance with certain embodiments. Classical encryption and decryption incur additional overheads. Graphs 1000 capture the amount of time 1020 taken for classical encryption and decryption of messages. Analytical results 1010 captured in FIGS. 10A and 10B illustrate times 1020 for a Monte Carlo set of 10,000 runs/occurrences 1030. As illustrated in in graph 1000a of FIG. 10A, the mean value 1040a for time 1020a to encrypt the messages for 10,000 runs/occurrences 1030a was 0.074 seconds. As illustrated in in graph 1000b of FIG. 10B, the mean value 1040b for time 1020b to decrypt the same messages for 10,000 runs/occurrences 1030b was 0.083 seconds, which is slightly higher. The length of the messages will play a role. It is expected that longer messages with more bits will take longer to encrypt and decrypt.

FIG. 11 illustrates a screenshot 1100 of post-quantum encryption results, in accordance with certain embodiments. Screenshot 1100 was generated using CRYSTALS Kyber public key encryption/KEM (Kyber 1024). In certain embodiments, this encryption scheme is used as a KEM to securely transfer an AES symmetric key. Screenshot 1100 of FIG. 11 shows post-quantum encryption being successfully executed.

Multiple security levels may be implemented for KEMs. In cryptography, a security level is a measure of the strength that a cryptographic primitive (e.g., a cipher or hash function) achieves. In certain embodiments, the security level is expressed as a number of bits (e.g., 80 bits, 112 bits, 128 bits, 192 bits, 256 bits, etc.) of security. For example, AES-128 provides a 128-bit security level. As another example, Kyber-512 roughly corresponds to AES 128, which provides a 128-bit security level. As still another example, Kyber-768 roughly corresponds to AES 192, which provides a 192-bit security level. As yet another example, Kyber-1024 roughly corresponds to AES 256, which provides a 256-bit security level. For the testing performed for screenshot 1100, Kyber-1024 was used.

Figure 12:
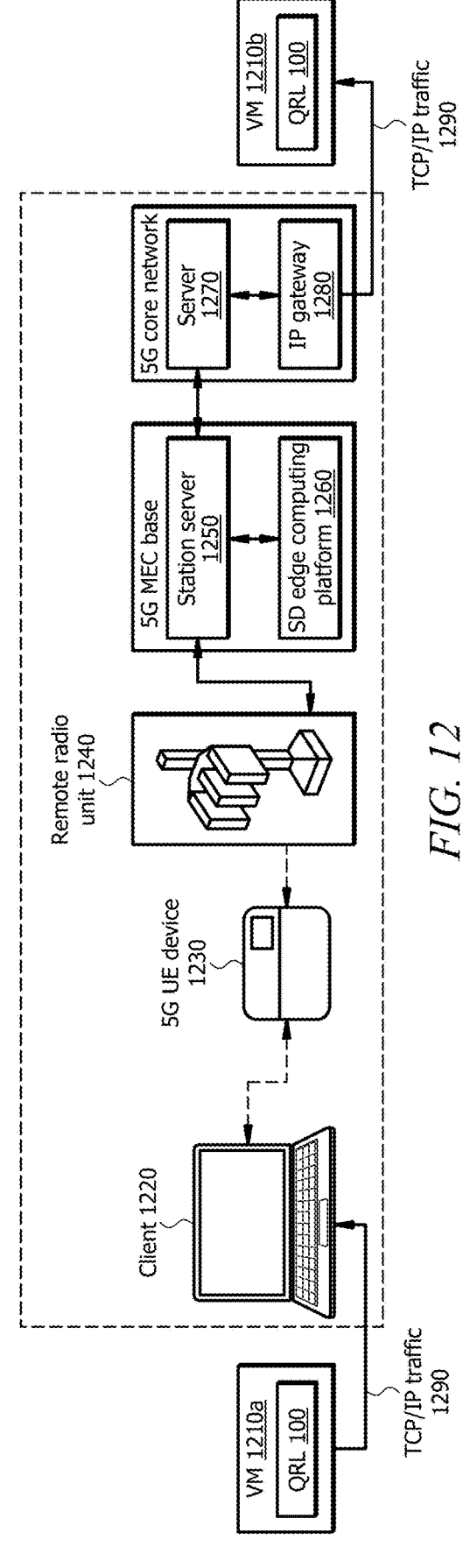
FIG. 12 illustrates a 5G end-to-end testbed, in accordance with certain embodiments.

FIG. 12 illustrates a 5G end-to-end testbed 1200, in accordance with certain embodiments. 5G end-to-end testbed 1200 is used to quantify network effects. In certain embodiments, 5G end-to-end testbed 1200 is more representative of an actual network stack than local loopback/intra subnet traffic. 5G end-to-end testbed 1200 allows for user equipment (UE)-to-UE message transition. In certain embodiments, 5G end-to-end testbed 1200 is assumed to capture all traffic for later analysis. In some embodiments, 5G end-to-end testbed 1200 is assumed to impair the network to produce legacy speeds.

In the illustrated embodiment of FIG. 12, 5G end-to-end testbed 1200 includes VMs 1210, a client 1220, a 5G UE device 1230, a remote radio unit 1240, a 5G multi-access edge computing (MEC) base station server 1250, a software-defined (SD) edge computing platform 1260, a 5G core network server 1270, and an IP gateway 1280.

VMs 1210 (e.g., VM 1210*a* and VM 1210*b*) of 5G end-to-end testbed 1200 represent virtual machines that serve as endpoints for 5G end-to-end testbed 1200. In certain embodiments, QRL runs on VMs 1210. In some embodiments, VMs 1210 need to be compatible with the VMWare set up in LoadCore of 5G end-to-end testbed 1200.

Client 1220 of 5G end-to-end testbed 1200 represents any application, plug-in, or other executable code that runs as a computer program on 5G UE device 1230. For example, in the illustrated embodiment of FIG. 12, client 1220 may represent a post-quantum messaging application.

5G UE device 1230 of 5G end-to-end testbed 1200 represents any user equipment (e.g., a workstation, a desktop computer, a smartphone, a tablet, a laptop, etc.) that is used to access a network. In the illustrated embodiment of FIG. 12, 5G UE device 1230 is a Samsung Galaxy S20 Ultra 5G.

Remote radio unit 1240 of 5G end-to-end testbed 1200 represents a radio hardware device that transform radio signals from/to the antenna into digital signals that may be sent across packet networks. In the illustrated embodiment of FIG. 12, remote radio unit 1240 includes a radio head and firmware.

5G MEC base station server 1250 of 5G end-to-end testbed 1200 represents a MEC application server that is deployed at a 5G base station. In the illustrated embodiment of FIG. 12, 5G MEC base station server 1250 is a Systel ruggedized server. In certain embodiments, 5G MEC base station server 1250 is associated with a 5G gNB O-RAN compliant Radio Unit (O-RU).

SD edge computing platform 1260 of 5G end-to-end testbed 1200 represents an edge platform for deploying edge networks. In certain embodiments, SD edge computing platform 1260 is Kubernetes-based. SD edge computing platform 1260 may deliver MEC for applications, containers, VMs, etc. SD edge computing platform 1260 may use the Radisys MEC solution, Intel Smart Edge, and the like.

5G core network server 1270 of 5G end-to-end testbed 1200 represents any suitable 5G network server. In certain embodiments, 5G core network server 1270 uses the 5G system architecture consisting of network functions (NF), These NFs include an Authentication Server Function (AUSF); a Core Access and Mobility Management Function (AMF); a Data network (DN), e.g. operator services, Internet access or 3rd party services; a Structured Data Storage network function (SDSF); an Unstructured Data Storage network function (UDSF); a Network Exposure Function (NEF); a NF Repository Function (NRF); a Policy Control function (PCF); a Session Management Function (SMF); a Unified Data Management (UDM); a User plane Function (UPF); and an Application Function (AF). In certain embodiments, 5G core network server 1270 is a rackmount server (e.g., a Colfax 1U server).

IP gateway 1280 of 5G end-to-end testbed 1200 represents a network device or computer system that serves as an access point or intermediary between different networks.

In certain embodiments, QRL is run over 5G end-to-end testbed 1200. Since the QRL instance works both in a local loopback as well as on the Amazon Web Service (AWS) EC2 server environment, the QRL instance was ran on the 5G infrastructure. 5G end-to-end testbed 1200 utilizes the 5G LoadCore product from Keysight. LoadCore provides a testing environment of the 5G Core. For example, LoadCore may provide different impairments that realistically represent the dynamic 5G environment. To ensure QRL works in the 5G/XG environment, VMs 1210 were used with 5G end-to-end testbed 1200, and quantitative measurements were performed. The goal was to determine 5G impacts on the QRL performance.

FIG. 13 illustrates code 1300 showing python TCP socket message exchange of a given length, in accordance with certain embodiments. FIG. 13 illustrates, in a simplified manner, the way in which the test was run on 5G end-to-end testbed 1200 of FIG. 12. Code 1300*a* represents the code used for sender node 1310*a*, and code 1300*b* represents the code used for receiver node 1310*b*. Receiver node 1310*b* was set up as an application running on a UE in the Loadcore system. Sender node 1310*a* was located on the distributed network (DN) within Loadcore. The QRL (e.g., QRL 150 of FIG. 1) was configured to transfer the keys via a socket on port 8000. LoadCore provided the appropriate routing, delay, and other impairments consistent with operating on a real 5G network.

Figure 14:
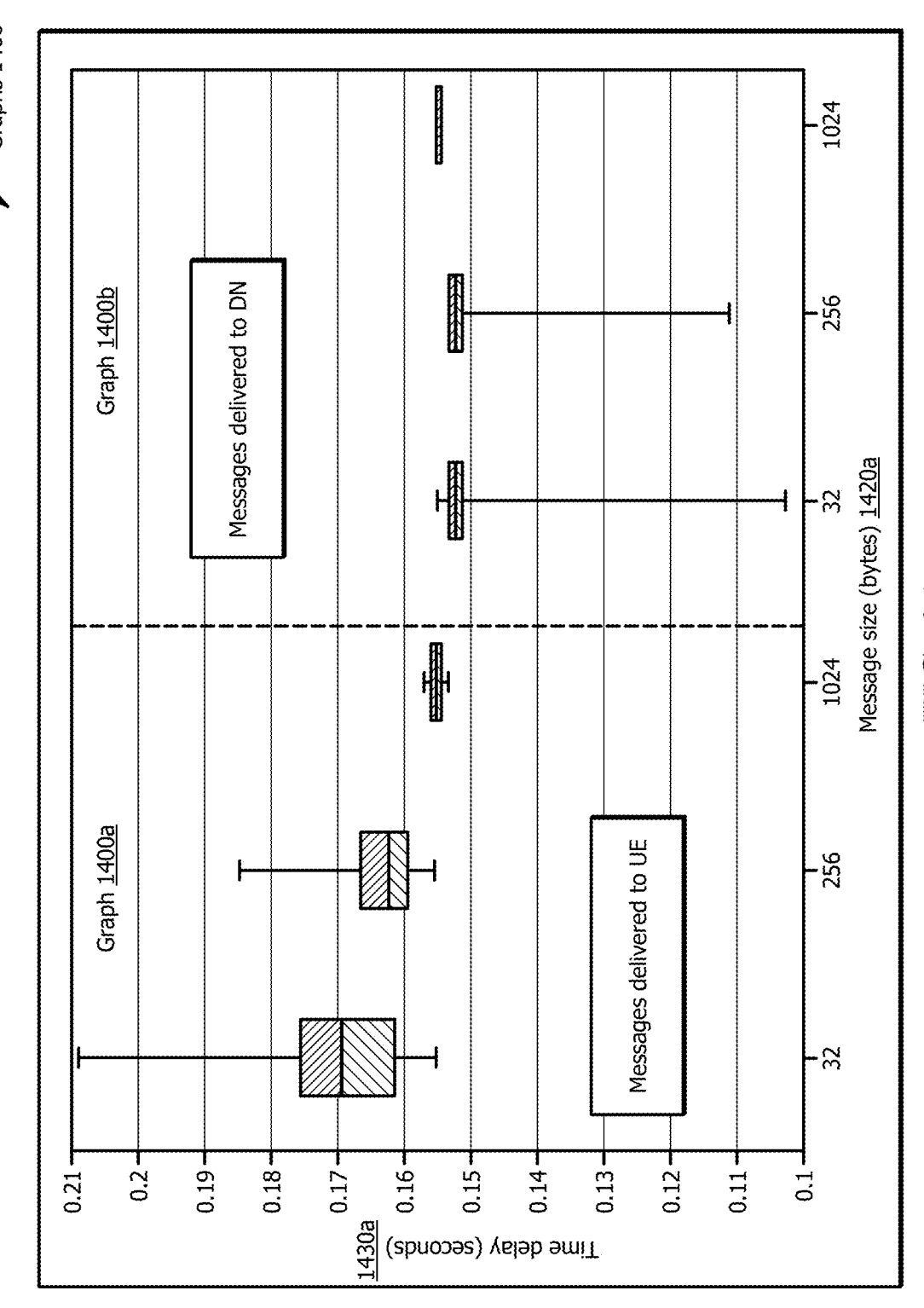
FIG. 14 illustrates graphs of example message time delays, in accordance with certain embodiments.

FIG. 14 illustrates graphs 1400 (e.g., graph 1400*a* and graph 1400*b*) of message time delays, in accordance with certain embodiments. Data was collected from tests conducted in accordance with 5G end-to-end testbed 1200 of FIG. 12 to analyze total message send time. Graph 1400*a* illustrates time delays 1430 for messages 1440*a* delivered to the UE, and graph 1400*b* illustrates time delays 1430 for messages 1440*b* delivered to the DN. Messages 1400 (e.g., messages 1400*a* and messages 1400*b*) may include text messages (e.g., Short Message Service (SMS) messages), multimedia content (e.g., Multimedia Messaging Service (MMS) messages), instant messaging, rich-content messages (e.g., rich-communication services (RCS) messages), push notifications, in-app messages, email messages, and the like.

Graphs 1400 illustrate an example case of sending an AES-256 key without encryption and the two encryption schemes, classical encryption (RSA-2048) and post quantum encryption (Kyber-1024). The differences in the schemes are simplified in graphs 1400 to the total number of bytes to be sent. Message size 1420 of 32 bytes represents no encryption, message size 1420 of 256 bytes represents classical encryption, and message size 1420 1024 bytes represents post-quantum encryption.

The results of the testing on 5G end-to-end testbed 1200 of FIG. 12 show that there is no slowdown with the larger key sizes. The box plots in graphs 1400 show an actual decrease in the overage time to deliver a message to the UE. This could be attributed to TCP slow start or other network optimizations that are activated as more data is sent. There is a slight increase in the time to deliver messages to the DN. These results show that even with the larger key sizes, the 5G network is not impacted. The public key exchange here is just the first step in transferring larger amounts of data. These public keys in the RSA and Kyber cases act as a KEM to derive an AES key. From there, only data will need to be exchanged and/or encrypted with this AES key. Only when connecting to a new receiver would new public keys need to be generated and/or shared.

In certain embodiments, to further enhance security and data protection, a permissioned-oriented blockchain network may be set up. Permissioned blockchain networks are ones where users publishing blocks must be authorized. Since only authorized users are maintaining the blockchain, it is possible to restrict read access and to restrict who can issue transactions. Permissioned blockchain networks may allow anyone to read the blockchain, or they may restrict read access to authorized users. They may allow any user to submit transactions to be included in the blockchain, or they may restrict this access only to authorized users.

In certain embodiments, permissioned blockchain networks have the same traceability of digital assets as they pass through the blockchain, as well as the same distributed, resilient, and redundant data storage system as a permissionless blockchain networks. In some embodiments, permissioned blockchain use consensus models for publishing blocks, but these methods often do not require the expense or maintenance of resources (as is the case with current permissionless blockchain networks). This is because the establishment of a user's identity is required to participate as a member of the permissioned blockchain network. Those maintaining the blockchain have a level of trust with each other, since they were all authorized to publish blocks and since their authorizations can be revoked if they misbehave. Consensus models in permissioned blockchain networks are then usually faster and less computationally expensive.

FIG. 15 illustrates a method 1500 for using a QRL for secure communications, in accordance with certain embodiments. Method 1500 starts at step 1510. At step 1520 of method 1500, a first network component identifies data. For example, referring to FIG. 2, node 210*a* may identify messages that are to be communicated to node 210*b*. Method 1500 then moves from step 1520 to step 1530.

At step 1520 of method 1500, the first network component determines a security level from a plurality of security levels associated with the data. In certain embodiments, the security level is associated with one of the following: an 80-bit security level, a 112-bit security level, a 128-bit security level, a 192-bit security level, or a 256-bit security level. Method 1500 then moves from step 1530 to step 1540.

At step 1540 of method 1500, the first network component determines an encryption scheme from a plurality of encryption schemes to apply to the data. The encryption scheme may be associated with one of the following: classical encryption, post-quantum encryption, or blockchain/DLT. Method 1500 then moves from step 1540 to step 1550.

At step 1550 of method 1500, the first network component applies, using QRL (e.g., QRL 150 of FIG. 1), the encryption scheme to the data to generate encrypted data. In certain embodiments, QRL represents a blockchain that includes a plurality of blocks. Each of the plurality of blocks may include a hash-based signature. In some embodiments, a single public key is generated using QRL and the single public key is leveraged to generate public/private key pairs. In some embodiments, QRL secures signatures used for transactions. In certain embodiments, the first network component and a second network component are categorized in accordance with a role-based validation rule. Method 1500 then moves from step 1550 to step 1560.

At step 1560 of method 1500, the first network component communicates the encrypted data to the second network component. For example, referring to FIG. 2, node 210*a* may communicate the encrypted data to node 210*b*. Method 1500 then moves from step 1560 to step 1570, where method 1500 ends.

Although this disclosure describes and illustrates particular steps of method 1500 of FIG. 15 as occurring in a particular order, this disclosure contemplates any suitable steps of method 1500 of FIG. 15 occurring in any suitable order. Although this disclosure describes and illustrates an example method for using QRL to apply an encryption scheme to data, including the particular steps of the method of FIG. 15, this disclosure contemplates any suitable method for using QRL to apply an encryption scheme to data, including any suitable steps, which may include all, some, or none of the steps of the method of FIG. 15, where appropriate. Although FIG. 15 describes and illustrates particular components, devices, or systems carrying out particular actions, this disclosure contemplates any suitable combination of any suitable components, devices, or systems carrying out any suitable actions.

FIG. 16 illustrates a computer system 1600, in accordance with certain embodiments. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference to an apparatus, system, or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A first network component, comprising one or more processors and one or more computer-readable non-transitory storage media coupled to the one or more processors and including instructions that, when executed by the one or more processors, cause the first network component to perform operations comprising:

generating a lattice transmission using at least one post-quantum encryption scheme;

signing the lattice transmission with a post-quantum, hash-based digital signature scheme;

communicating the lattice transmission to a Quantum Resistant Ledger (QRL) blockchain;

obtaining a public key of a second network component from the QRL blockchain, wherein the QRL blockchain is secured with lattice-based cryptography;

identifying data;

determining a security level from a plurality of security levels associated with the data;

determining an encryption scheme from a plurality of encryption schemes to apply to the data;

applying, using a Quantum Resistant Ledger (QRL) and the public key of the second network component, the encryption scheme to the data to generate encrypted data; and communicating the encrypted data to the second network component.

2. The first network component of claim 1, wherein:

The QRL blockchain comprises a plurality of blocks; and each of the plurality of blocks comprises a hash-based signature.

3. The first network component of claim 1, the operations further comprising:

generating, using the QRL, a single public key; and leveraging the single public key to generate public/private key pairs.

4. The first network component of claim 1, the operations further comprising securing, using the QRL, signatures used for transactions.

5. The first network component of claim 1, the operations further comprising categorizing the first network component and the second network component in accordance with a role-based validation rule.

6. The first network component of claim 1, wherein the encryption scheme is associated with one of the following:

classical encryption;

post-quantum encryption; or distributed ledger technology (DLT).

7. The first network component of claim 1, wherein the security level is associated with one of the following:

an 80-bit security level;

a 112-bit security level;

a 128-bit security level;

a 192-bit security level; or a 256-bit security level.

8. A method, comprising:

generating a lattice transmission using at least one post-quantum encryption scheme;

signing the lattice transmission with a post-quantum, hash-based digital signature scheme;

communicating, by a first network component, the lattice transmission to a Quantum Resistant Ledger (QRL) blockchain;

obtaining a public key of a second network component from the QRL blockchain, wherein the QRL blockchain is secured with lattice-based cryptography;

identifying, by the first network component, data;

determining a security level from a plurality of security levels associated with the data;

determining an encryption scheme from a plurality of encryption schemes to apply to the data;

applying, using a Quantum Resistant Ledger (QRL) and the public key of the second network component, the encryption scheme to the data to generate encrypted data; and communicating the encrypted data to the second network component.

9. The method of claim 8, wherein:

the QRL blockchain comprises a plurality of blocks; and each of the plurality of blocks comprises a hash-based signature.

10. The method of claim 8, further comprising:

generating, using the QRL, a single public key; and leveraging the single public key to generate public/private key pairs.

11. The method of claim 8, further comprising securing, using the QRL, signatures used for transactions.

12. The method of claim 8, further comprising categorizing the first network component and the second network component in accordance with a role-based validation rule.

13. The method of claim 8, wherein the encryption scheme is associated with one of the following:

classical encryption;

post-quantum encryption; or distributed ledger technology (DLT).

14. The method of claim 8, wherein the security level is associated with one of the following:

an 80-bit security level;

a 112-bit security level;

a 128-bit security level;

a 192-bit security level; or a 256-bit security level.

15. One or more computer-readable non-transitory storage media embodying instructions that, when executed by a processor, cause the processor to perform operations comprising:

generating a lattice transmission using at least one post-quantum encryption scheme;

signing the lattice transmission with a post-quantum, hash-based digital signature scheme;

communicating, by a first network component, the lattice transmission to a Quantum Resistant Ledger (QRL) blockchain;

obtaining a public key of a second network component from the QRL blockchain, wherein the QRL blockchain is secured with lattice-based cryptography;

identifying, by the first network component, data;

determining a security level from a plurality of security levels associated with the data;

determining an encryption scheme from a plurality of encryption schemes to apply to the data;

applying, using a Quantum Resistant Ledger (QRL) and the public key of the second network component, the encryption scheme to the data to generate encrypted data; and communicating the encrypted data to the second network component.

16. The one or more computer-readable non-transitory storage media of claim 15, wherein:

The QRL blockchain comprises a plurality of blocks; and each of the plurality of blocks comprises a hash-based signature.

17. The one or more computer-readable non-transitory storage media of claim 15, the operations further comprising:

generating, using the QRL, a single public key; and leveraging the single public key to generate public/private key pairs.

18. The one or more computer-readable non-transitory storage media of claim 15, the operations further comprising securing, using the QRL, signatures used for transactions.

19. The one or more computer-readable non-transitory storage media of claim 15, the operations further comprising categorizing the first network component and the second network component in accordance with a role-based validation rule.

20. The one or more computer-readable non-transitory storage media of claim 15, wherein the encryption scheme is associated with one of the following:

classical encryption;

post-quantum encryption; or distributed ledger technology (DLT).

\* \* \* \* \*